United States Patent
Nozaki et al.

(10) Patent No.: US 7,913,281 B2
(45) Date of Patent: Mar. 22, 2011

(54) DIGITAL BROADCAST RECORDING DEVICE

(75) Inventors: Koji Nozaki, Daito (JP); Akihiro Yuba, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 606 days.

(21) Appl. No.: 11/861,004

(22) Filed: Sep. 25, 2007

(65) Prior Publication Data
US 2008/0184291 A1 Jul. 31, 2008

(30) Foreign Application Priority Data

Sep. 28, 2006 (JP) ................................ 2006-264030

(51) Int. Cl.
*G06F 3/00* (2006.01)
*H04N 5/76* (2006.01)
*H04N 5/222* (2006.01)

(52) U.S. Cl. ........... 725/58; 386/291; 386/292; 348/371

(58) Field of Classification Search ................ 725/38
See application file for complete search history.

(56) References Cited

U.S. PATENT DOCUMENTS

| 5,801,787 A * | 9/1998 | Schein et al. ............. 725/43 |
| 6,359,580 B1 * | 3/2002 | Morrison ................. 348/731 |
| 6,601,237 B1 * | 7/2003 | Ten Kate et al. ............ 725/47 |
| 7,639,310 B2 * | 12/2009 | Kang ...................... 348/731 |
| 2002/0009283 A1 * | 1/2002 | Ichioka et al. ............ 386/46 |
| 2003/0056216 A1 * | 3/2003 | Wugofski et al. .......... 725/46 |
| 2005/0100053 A1 * | 5/2005 | Kang ...................... 370/486 |
| 2006/0035610 A1 * | 2/2006 | Potrebic ................ 455/178.1 |
| 2007/0006266 A1 * | 1/2007 | Yamamoto ................. 725/46 |
| 2007/0050817 A1 * | 3/2007 | Yi Lee ................... 725/54 |

FOREIGN PATENT DOCUMENTS

| JP | 2004214777 | 7/2004 |
| JP | 2004343235 | 12/2004 |

* cited by examiner

*Primary Examiner* — Brian T Pendleton
*Assistant Examiner* — Jean D Saint Cyr
(74) *Attorney, Agent, or Firm* — Pillsbury Winthrop Shaw Pittman, LLP

(57) ABSTRACT

This digital broadcast recording device includes a tuner unit, a channel table recording unit, an image output unit, an OSD generation unit, an actuation unit, and a channel presetting unit. The channel table recording unit records a channel table. An auto presetting unit sets virtual channels. If the number of a virtual channel is duplicated upon several physical channels, the channel presetting unit commands the OSD generation unit to display an OSD to the effect that this number is duplicated. And, when the actuation unit has received a predetermined actuation input, the channel presetting unit searches for a vacant channel.

1 Claim, 4 Drawing Sheets

DIGITAL BROADCAST RECORDING DEVICE

CROSS REFERENCE

This Nonprovisional application claims priority under 35 U.S.C. §119(a) on Patent Application No. 2006-264030 filed in Japan on Sep. 28, 2006, the entire contents of which are hereby incorporated by reference.

BACKGROUND OF TEE INVENTION

In the prior art, digital broadcasting has been implemented in practice, with a TS (transport stream) being transmitted from each broadcasting station by being carried upon a corresponding RF signal at a predetermined frequency. The channel of this RF signal is termed a physical channel. Furthermore, within this TS, it is possible for a plurality of programs to be transmitted in multiplex, and the channels which correspond to each of these programs are termed virtual channels.

When first starting to use a digital broadcast reception device, primarily it is the user who performs the task of registering the correspondence between virtual channels and programs. In order to make this task of registration simple and easy, information giving the numbers of the virtual channels is transmitted in the digital broadcast all together, and moreover, in practice, an auto presetting function is implemented in the reception device of registering the virtual channels automatically based upon this information.

This type of auto presetting function is convenient, but sometimes it is difficult to set all of the channels automatically. In particular, if it is possible to receive a digital broadcast outside of its region, then sometimes the number of virtual channels which depend upon physical channels from the various stations may overlap. In this case, when auto presetting is performed, it is necessary to omit registration of the virtual channel from one of these broadcasting stations, and thus performing auto presetting is sometimes not necessarily convenient from the point of view of the user. Accordingly proposals have been made to enhance the ease of use in these circumstances (in Japanese Laid-Open Patent Publication 2004-343235 and Japanese Laid-Open Patent Publication 2004-214777).

In Japanese Laid-Open Patent Publication 2004-343235, in order to make it possible to select by remote control a desired broadcast even if channel numbers are duplicated upon a plurality of broadcasts, if it is possible to receive a broadcast outside its region, it is described (FIG. 4) to append auxiliary numbers to the channel numbers, and to display the settings of these auxiliary numbers to the user so as to invite him to make a selection among them; and it is also described (FIG. 5, paragraph 28 etc.), at the time point that the inputting of the main number has been completed, along with displaying a message to the effect that duplication is present, to invite the user to make a selection among the auxiliary numbers. Moreover, the concept is described of scanning the physical channels when starting.

Furthermore, in Japanese Laid-Open Patent Publication 2004-214777, a device is disclosed which, in order to reduce the labor involved in the task of registering the virtual channels when receiving digital broadcasts and analog broadcasts upon a physical channel which includes a sub-channel which is selected, to store the virtual channel numbers and the sub-channel numbers for each physical channel (i.e. for each frequency), and to display an OSD (On Screen Display) of the channel numbers.

However, in the selection of auxiliary numbers described in Japanese Laid-Open Patent Publication 2004-343235, the problem has arisen that two actuations are needed since it is necessary to select an auxiliary number after having selected a main number, and it takes a considerable amount of trouble to change over between the large number of channels using up and down keys, since the channels are not numbered consecutively.

Furthermore, it is described in this publication that, when an auxiliary number is once selected, the broadcasts with this auxiliary number are received automatically. However, when an appointment for recording a digital broadcast is made, then the broadcast with this auxiliary number is received automatically, and there has been the possibility of it not being possible to record the intended program.

Moreover, with digital broadcasting, it frequently happens that a broadcast may be interrupted partway through and then revive, and with only scanning the physical channels when starting, as described in paragraph 24 of Japanese Laid-Open Patent Publication 2004-343235, there has been the possibility that it may not be possible to rely upon recording of the intended program. In this type of case, when the recording appointment is made directly before the start of the program, if the channel which is to be received is not displayed, then there is a fear that the user may mistakenly start recording of a different program (one on a different physical channel) which has the same virtual channel number. In particular, when making a recording appointment, the possibility of making a mistake is high, since it is not possible to record a broadcast after having confirmed the actual broadcast upon the display unit. Furthermore, even if the user does realize that his desired channel is not displayed, in order to scan the physical channels, there has been nothing he can do except restart. And there is a fear that, during this restarting process, it is not possible for him to record the starting segment of the program which he desires to record.

Accordingly the present invention takes it as its objective to provide a digital broadcast recording device with which the ease of use when registering a virtual channel is enhanced if, when receiving digital broadcasts, virtual channel numbers which depend upon different physical channels overlap.

SUMMARY OF THE INVENTION

The digital broadcast recording device according to the present invention includes a tuner unit, a channel table generation means, an OSD generation unit, an actuation unit, and a channel presetting means.

The tuner unit receives a digital broadcast, and acquires numbers of one or more virtual channels included in each physical channel.

The channel table generation means commands the tuner unit to scan the physical channels over a predetermined range of frequencies, and creates and updates a channel table in which a correspondence is maintained between physical channels and virtual channels.

The OSD generation unit outputs an OSD (On Screen Display) for displaying various states of this digital broadcast reception device.

The actuation unit receives commands for setting and operation of this digital broadcast reception device. And the channel presetting means performs setting of the numbers of virtual channels, based upon the channel table.

Moreover if, when setting the number of the virtual channels, it has been decided that the number of a virtual channel is duplicated upon several physical channels, then the channel presetting means performs the following channel duplication cancellation processing: (A) commanding the OSD generation unit to output an OSD to the effect that this number is duplicated; (B) when this OSD is being outputted, receiving a selection from the actuation unit of a setting for a number for the duplicated virtual channel; and (C) when this selection has been received, searching for a vacant channel number which is not set as the virtual channel, and setting one of the virtual channel numbers which is duplicated to the vacant channel number.

DETAILED DESCRIPTION OF THE INVENTION

Figure 1:
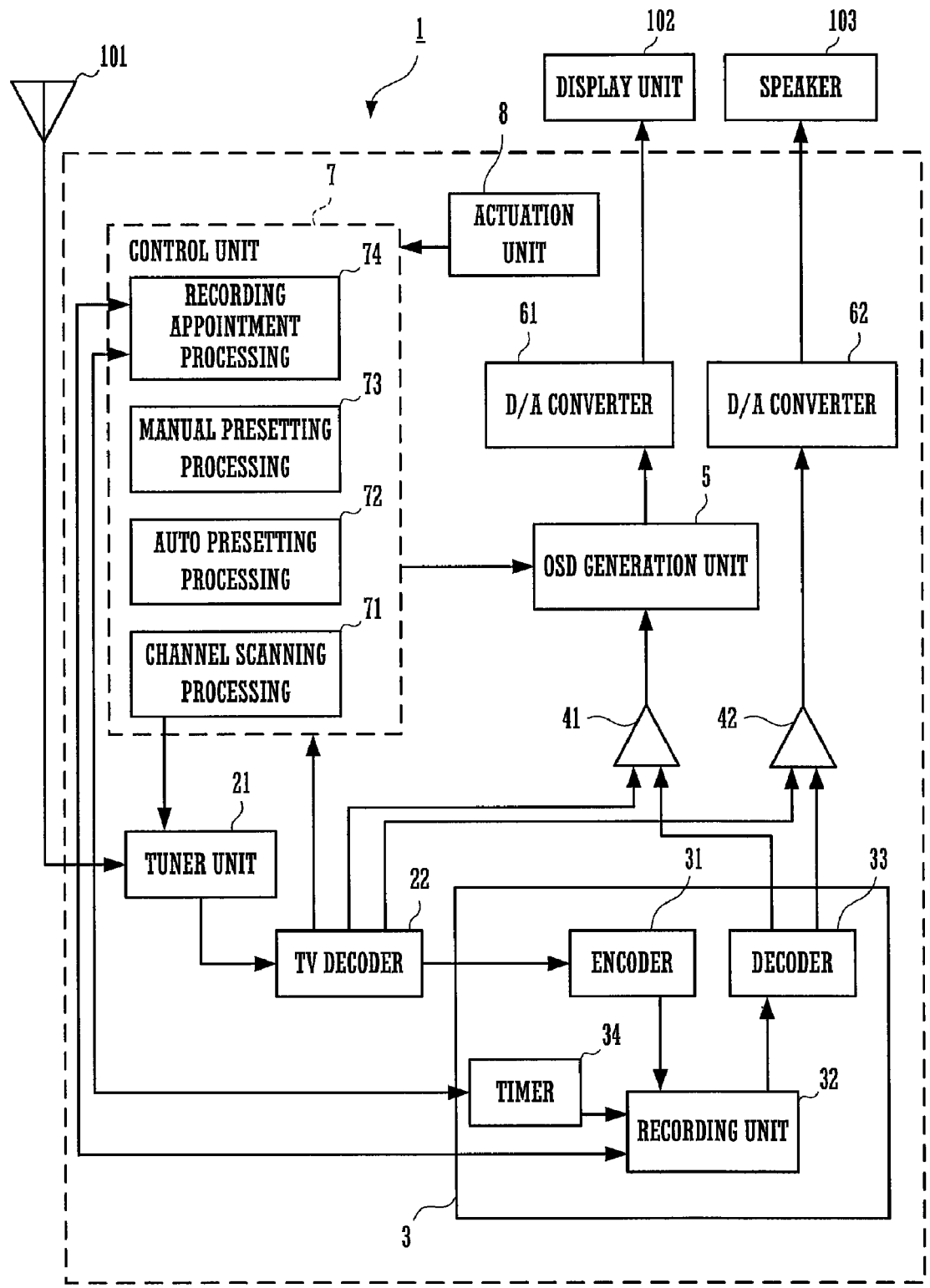
FIG. 1 is a structural diagram of a digital broadcast recording device according to a first embodiment of the present invention.

The structure of a digital broadcast recording device (1 in the figure) according to a first embodiment of the present invention will now be described with reference to FIG. 1. This digital broadcast recording device 1 is a recording device which receives a digital broadcast, and records the program which has been received.

First, as a preliminary to explaining the structure of this digital broadcast recording device 1, the physical channels and virtual channels will be explained. From the broadcasting station upon each channel, a single TS (transport stream) is transmitted, carried upon a RF signal of a single corresponding predetermined frequency. The channel of this RF signal is termed a physical channel. Furthermore, often a plurality of broadcast programs (hereinafter simply termed programs) are transmitted from this TS as multiplexed, and the channel which corresponds to each of these programs is termed a virtual channel. These virtual channels are channels for the user to select programs using a remote control or the like.

Next, the structure of the digital broadcast recording device 1 will be explained. This digital broadcast recording device 1 comprises a tuner unit 21, a TV decoder 22, a recording unit 3, selectors 41 and 42, an OSD (On Screen Display) generation unit 5, an actuation unit 8, and a display unit 102.

The tuner unit 21 comprises a tuner, a demodulation circuit, an error correction circuit, a separation circuit, a demultiplexer, and a buffer memory, none of which are explicitly shown in the figures. The tuner receives radio waves from the antenna 101, extracts the broadcast signal of a channel which is set by the control unit 7, and outputs it to the demodulation circuit. And the demodulation circuit demodulates the broadcast signal which is inputted, and outputs the result to the error correction circuit. The error correction circuit corrects any erroneous information upon the TS (transport stream) which is inputted. And the separation circuit separates the TS from the signal which is outputted from the error correction circuit, and outputs that TS.

Along with the programs of a plurality of virtual channels being transmitted upon the TS as multiplexed, information about the virtual channel numbers is also included. The demultiplexer extracts the packets for one channel from among these virtual channels, and, along with storing the data stored in these extracted packets in a buffer memory, also outputs information about the channel numbers to the control unit 7.

The TV decoder 22 receives commands or permissions from the control unit 2, and reads out the appropriate data stored in the buffer memory within the tuner 21. And it separates the video data and the audio data from this data which has been read out, expands both of these streams of data, and outputs them. The TV decoder inputs the video data to a selector 41 and to the recording unit 3, and inputs the audio data to a selector 42 and to the recording unit 3. By doing this, the TV decoder 22 obtains from the TS the picture signal of the predetermined virtual channel which has been set by the control unit 7.

The recording unit 3 comprises an encoder 31, a recording unit 32, a decoder 33, and a timer 34. When performing a recording appointment processing 74, the recording unit 3 receives a command from the control unit 7, and records the video signal and the audio signal of the TV decoder 22. The encoder 31 encodes these, for example, in the MPEG format. And the recording unit 32 comprises a recording/reading out unit which performs recording upon a recording medium (which not only may be a removable medium, but also may be a fixed medium) and reading out therefrom, and which records the encoded picture signal. The recording medium which is used in this embodiment of the present invention may be a CD, a DVD, a hard disk, a video tape, or the like; any medium would be acceptable, provided that it is capable of recording a picture signal. If the recording medium is a DVD, the recording/reading out unit may be, for example, an optical pickup. And the decoder 33 decodes the picture signal which has thus been read out by the recording unit 32.

It should be understood that, in the following, recording of a video signal and an audio signal will be termed "recording".

The selector 41 selects the video signal of the TV decoder 22 or of the decoder 33. And the selector 42 selects the audio signal of the TV decoder 22 or of the decoder 33. When a picture file is being replayed, the recording unit 3 selects the inputs of the decoder 33, and in other cases selects the inputs of the TV decoder 22.

The OSD generation unit 5 displays various types of setting of this digital broadcast recording device 1, and outputs a video signal which is a character drawing for the user to select these settings. The OSD generation unit 15 comprises an OSD image memory, and creates an image signal of characters or drawings stored in this OSD image memory based upon control signals supplied from the control unit 7 and outputs this image signal. When an image signal is outputted from the selector 41, these image signals are combined together.

The D/A converter 61 converts the video signal outputted from the OSD generation unit 5 into an analog image signal, which it outputs to an external display unit 102 (a television receiver or the like). And this D/A converter 62 converts the audio signal outputted from the selector 42 to an analog audio signal, which it outputs to a speaker 103.

The control unit 7 comprises a ROM which stores sub-programs within the control unit 7, a CPU which performs various types of calculations and executes sub-programs, and a RAM which temporarily stores the results of calculations by the control unit 7. By doing this, the control unit 7 controls the various sections within this digital broadcast recording device 1. For example, it controls the timing of recording and reading out of the buffer RAM within the tuner 21, changing over of the selectors 41 and 42, timing of recording to the recording unit 32, and the like. Furthermore, the control unit 7 stores programs in the above described ROM for performing a channel scanning processing 71, an auto presetting processing 72, a manual presetting processing 73, and a recording appointment processing 74. The control unit 7 executes these programs, and thereby performs these processings.

The channel scanning processing 71 is a processing in which the control unit 7 commands the tuner unit 21, and thus creates a channel table in which a correspondence is kept between the physical channels and the numbers of the virtual channels which depend upon these physical channels. When this processing 71 is executed, the tuner unit 21 scans the physical channels and collects information about the virtual channels. Furthermore, the tuner unit 21 extracts the broadcast signal for each of the physical channels. Moreover, the control unit 7 collects information about the virtual channel numbers from the demultiplexer of the tuner unit 21, and stores the channel table in the RAM within the control unit 7 (or in a RAM not shown in the figures which is connected to the control unit, or in the tuner unit). As previously described, since information about the virtual channel numbers is contained in the TS which is generated from each physical channel broadcast signal, accordingly this information is collected while scanning the physical channels.

The auto presetting processing 72 is a processing in which, during initial setting when the user has purchased the device 1 or the like, the control unit 7 receives commands from the actuation unit 8, and automatically sets the virtual channels. When this processing 72 is executed, the control unit 7 obtains the channel table by executing the channel scanning processing 71, and sets the virtual channels automatically based upon this table. By doing this, the user is able to select a virtual channel from the remote control of the actuation unit 8, and to view this program, even without himself setting the channels. Moreover, when the control unit 7 executes this processing 72, it searches the channel table, and decides whether or not the numbers of the virtual channels are duplicated between a plurality of physical channels. Here, on the borderline between two broadcast areas or the like, sometimes it is possible to received a broadcast from both of these areas. In this case, sometimes it is possible to receive two broadcasts from different broadcasting stations upon virtual channels of the same number. Accordingly, if two channels exist with the same duplicated number, then the system invites the user to execute the manual presetting processing 73, by outputting a display (for example a pop-up display or the like) to the effect that the virtual channel number is duplicated to the OSD generation unit 5. For those channels for which this type of duplication does not occur, the control unit sets the virtual channels automatically.

The manual presetting processing 73 is a processing in which a channel setting which is performed manually by the user is received. For example if, in the state in which a program is currently being displayed upon the display unit 102, a predetermined actuation input is performed from the actuation unit 8, then an OSD is outputted, and selection and setting of the virtual channel number of this program are received.

The recording appointment processing 74 is a processing in which a recording appointment is received to schedule recording of a broadcast. When this recording appointment processing is executed, the control unit 7 commands the OSD generation unit 5, and outputs an OSD (On Screen Display) which invites the user to make a recording appointment. Furthermore, while outputting this OSD, the control unit 7 receives from the actuation unit 8 setting of the time instant for recording, and selection and setting of the channel or the like to be recorded. When these settings have been received, a timer 34 is operated. When the time measured by the timer 34 reaches the recording time instant set by the user, recording of the predetermined channel is started. Furthermore, the flow of control shown in FIG. 2 and described hereinafter is executed.

The actuation unit 8 comprises actuation members which are fitted to the device 1, a remote control, and a remote control photo-reception unit which receives infra-red signals from the remote control. This actuation unit 8 receives control inputs for actuating the control unit 7. When an actuation member of the device 1 or of the remote control is depressed, a predetermined control input is inputted to the control unit 7.

Furthermore, the display unit 102 is external to the device 1, and displays the video signal which has been outputted from the D/A converter 6.

Next the flow of processing for receiving selection of a channel, which is performed by the control unit 7 during execution of the recording appointment processing 74, will be explained with reference to FIG. 2.

In a step ST1, the channel scanning processing 71 is executed in advance, and the physical channels are scanned and the channel table is updated. The control unit 7 executes this step ST1 each time it performs recording appointment processing.

In a step ST2, an OSD for recording appointment processing is outputted so that a selection of the virtual channel for recording appointment may be received from the actuation unit 8, and the system waits until a selection is made (NO in the step ST2). When a selection of a virtual channel for recording appointment is received from the actuation unit 8 (YES in the step ST2), then the flow of control proceeds to a step ST3.

In this step ST3, a decision is made as to whether or not the number of the virtual channel for recording appointment is duplicated upon a plurality of physical channels. If the number of the virtual channel is duplicated, then the flow of control proceeds to a step ST4. If it is not duplicated, then the processing flow of FIG. 2 terminates.

In the step ST4, an OSD message to the effect "number of virtual channel duplicated" is outputted upon the display unit 102. It would also be acceptable, for example, to arrange to display this message as a pop-up (a small box which suddenly pops up upon the computer screen) or a blow-out (a word balloon). In this step ST4, in order to receive selection of the channel to be displayed when the user is recording, along with the OSD message to the effect that the virtual channel is duplicated, OSD options to the effect of "select original channel number" and "search for vacant channel number" are outputted to the display unit 102.

In a step ST41, the system receives selection of any one among the channels which are duplicated, and waits until such a selection is received.

And, in a step ST5, a selection of "select original channel number" or "search for vacant channel number" is received from the actuation unit 8. If "select original channel number" has been selected (YES in this step ST5), then in a step ST6 the original channel number is set as the channel for which recording is appointed. On the other hand, if "search for vacant channel number" has been selected (NO in this step ST5), then in a step ST7 a vacant channel number is found, and is set as the virtual channel. In this step ST7, this vacant channel number is set as the channel for which recording is appointed. Thereafter, the flow of processing of FIG. 2 terminates.

It should be understood that, after this flow has terminated, setting of the next time instant for recording, or setting of recording for another program, may be received. And, in the recording appointment processing for some other program, when channel selection is to be performed, this flow of processing is executed again.

The recording appointment processing 74 shown in FIG. 2 will now be explained further. Although, in the above explanation, it was arranged to designate the channel number and the recording time instant manually by direct actuation, it would also be acceptable to endow this digital broadcast recording device 1 with the processing of receiving the internet, so that it can download a program list via the internet and receive selection of a program to record via the internet. Although in the above explanation, in the step ST1, it was arranged always to scan the physical channels, if it is possible to ascertain the totality of channel numbers via the internet in this manner, then it would also be acceptable not to implement the step ST1, but, after the step ST2, to perform the channel scanning processing 71 for the necessary minimum limit of physical channels, in order to decide whether or not only the channel which is selected is duplicated.

Furthermore, although it would also be acceptable not necessarily to execute the channel scanning processing 71 of the step ST1 each time, with digital broadcasts, sometimes it happens frequently that a broadcast may be interrupted partway through and may then revive. Accordingly, it is desirable to perform the channel scanning processing of the step ST1 in advance, in order reliably to record the program intended by the user. Furthermore, if the desired channel is not displayed in the step ST3, then it would also be acceptable to arrange to receive operation of the channel scanning processing 71.

Although a vacant channel number was searched for in the step ST6, this is not limitative of the present invention; it would also be acceptable to receive a channel setting as desired by the user. This is because the channel which is set during recording only influences the file which is recorded at this time, and is a setting which cannot exert an influence upon other channels. Furthermore, it would also be acceptable not to perform automatic setting in the step ST6, but rather to display the vacant channel number candidates, so that the user is enabled to select a vacant channel number with the manual presetting processing 73.

Figure 3:
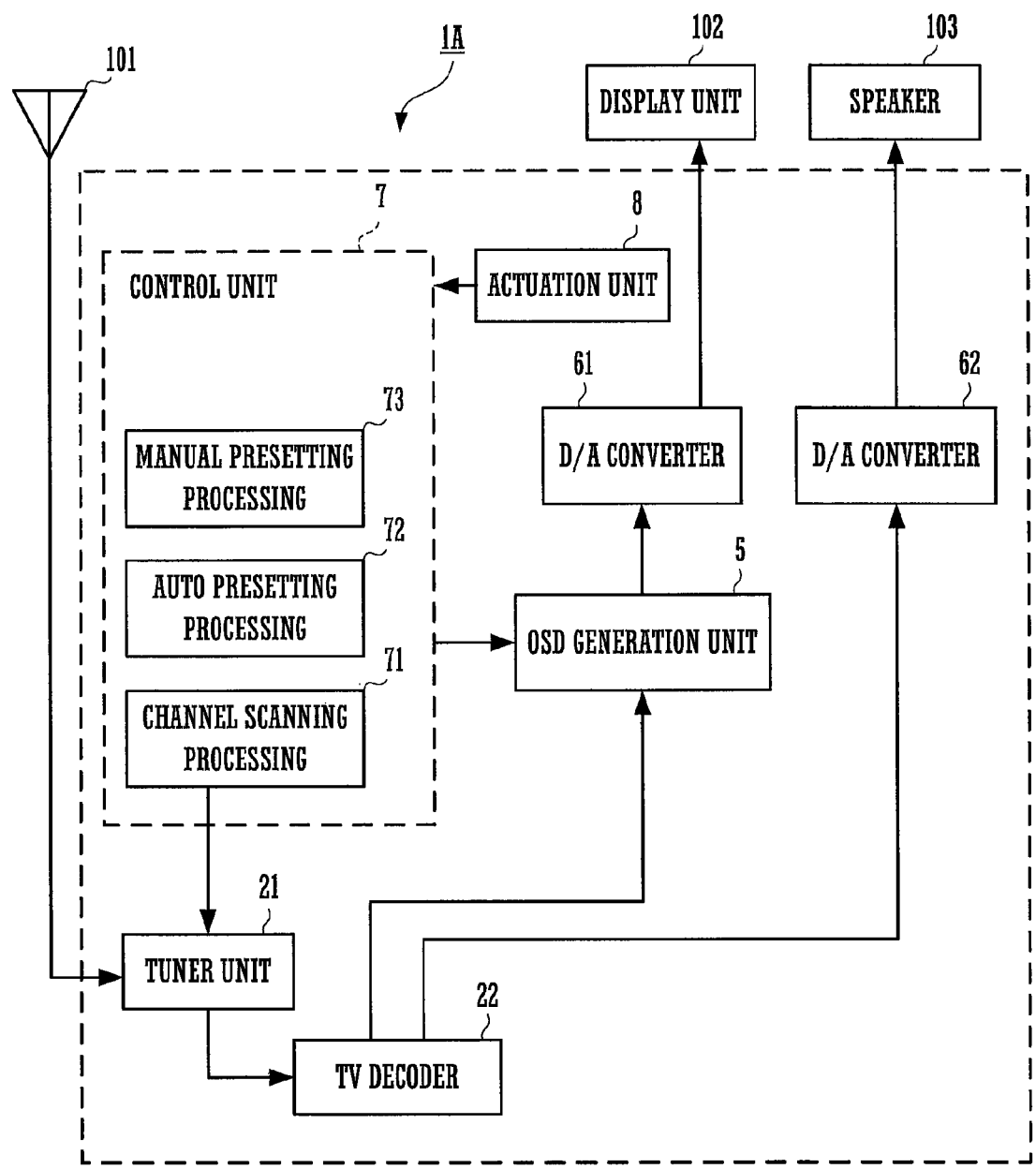
FIG. 3 is a structural diagram of a digital broadcast reception device (a television receiver) according to a second embodiment of the present invention.
Figure 4:
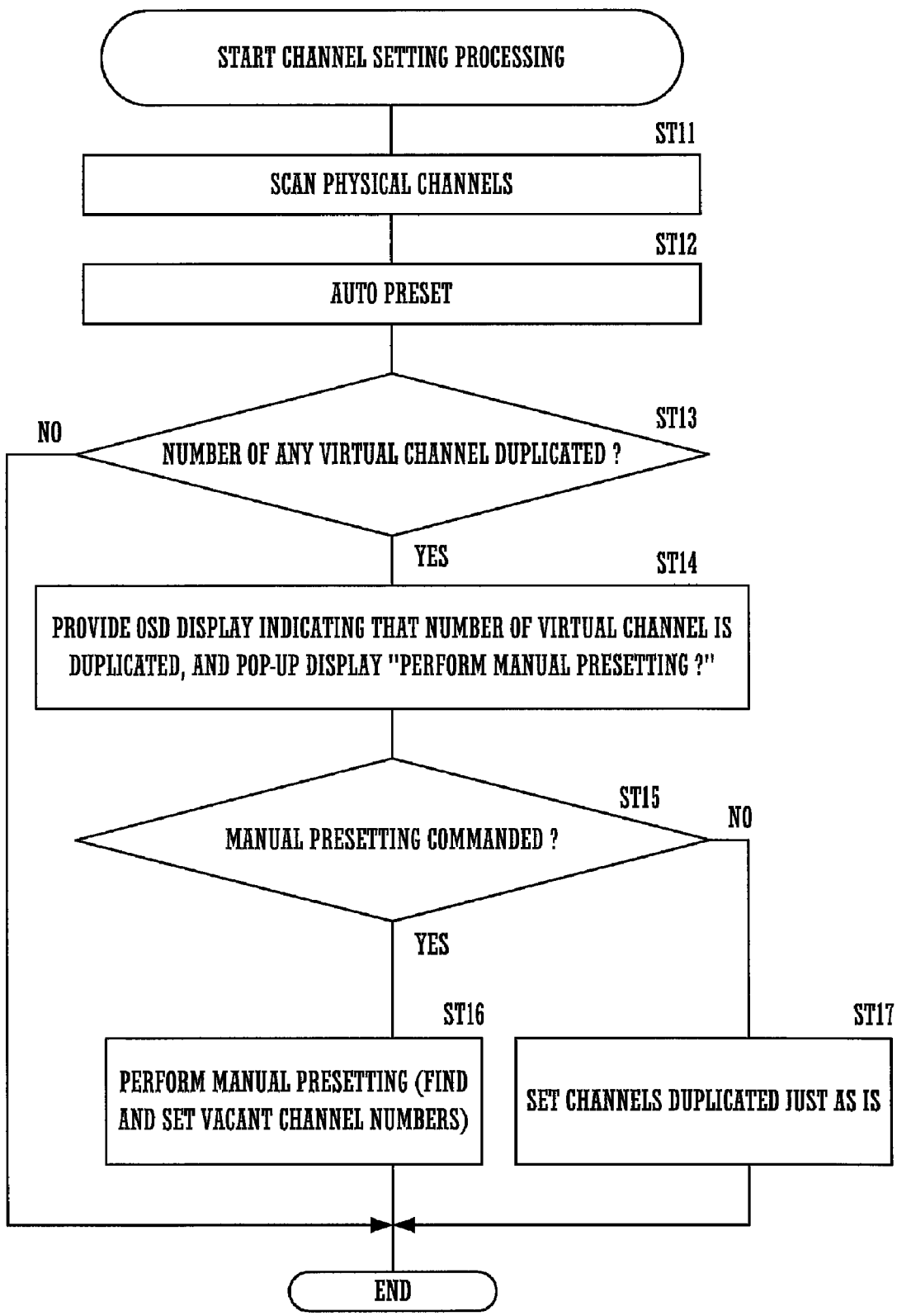
FIG. 4 is a flow chart showing the flow of control during channel setting processing by this digital broadcast recording device according to the second embodiment.

Next, a digital broadcast reception device (1A as seen in the figures) according to a second embodiment of the present invention, related to application of the first embodiment, will be explained with reference to FIGS. 3 and 4. FIG. 3 is a structural diagram of this digital broadcast reception device 1A, and FIG. 4 is a flow chart showing the channel setting processing during initial setting or the like. This digital broadcast reception device 1A is a device which receives digital broadcasts, and may be a device which is externally attached to a television receiver or one which is internal to a television receiver. The difference from the digital broadcast recording device 1 of the first embodiment is that the recording unit 3 is not included. Since the other elements of the structure of this digital broadcast reception device 1A are the same as those of the digital broadcast recording device 1, the above explanation of these elements will suffice, and will not be repeated here.

The control unit 7 executes the processing described in the flow chart of FIG. 4 when a predetermined input is received from the actuation unit 8. In concrete terms, this processing is in principle executed when the user has purchased the digital broadcast reception device 1A or the like, and when he is initially setting the virtual channels; but it may also be executed later, if he wants to change or rectify the virtual channel settings. By executing this processing, it becomes possible to select a program upon a channel from the remote control of the actuation unit 8.

In a step ST11 the channel scanning processing 71 is executed, and a channel table is created and is stored in the memory.

In a step ST12, the manual presetting processing 73 is executed, and channel setting is performed.

In a step ST13, the channel table is referred to, and a decision is made as to whether or not the number of any virtual channel is duplicated upon a plurality of physical channels. If the number of some virtual channel is duplicated (YES in the step ST13), then the flow of control is transferred to a step ST14. But, if no virtual channel is duplicated (NO in the step ST13), then this processing sequence terminates.

In the step ST14, an OSD display to the effect that "the number of a virtual channel is duplicated" and a pop-up display "perform manual presetting (YES/NO)" are displayed by OSD.

In a step ST15, input of a command for manual presetting by selection from the two alternatives YES/NO is awaited from the actuation unit 8, and a decision is made as to whether or not this command is inputted. If input of the command "YES" for manual presetting is received (YES in the step ST15), then the flow of control proceeds to a step ST16. In this step ST16, a vacant channel number is searched for, and the virtual channel is automatically set. On the other hand, if input of the command "NO" for manual presetting is received (NO in the step ST15), then in the step ST16 the virtual channel is set duplicated, just as it is. For example, one of the channels only may be registered.

It should be understood that although, in the step ST16, a vacant number is searched for and the virtual channel is set automatically, it would also be acceptable to enable the user to perform manual selection by showing one candidate for the vacant is channel number, providing a display "set channel number (YES/NO)" for the user to confirm or reject this candidate, to receive "YES" or "NO" as confirmation input, and to display another candidate for the vacant channel number if this confirmation input is "NO". However since, if this type of selection request is made, often the user experiences a feeling of difficulty in making the selection, accordingly, in the request "set channel number (YES/NO)" described above, it is desirable to restrict the number of candidates for the vacant channel number to one.

The above explanation of the embodiments will now be supplemented.

With the digital broadcast recording device 1 of the first embodiment as well, during the initial setting of the channels, it would also be acceptable to perform the initial setting of the digital broadcast reception device 1A of the second embodiment shown in FIG. 4. Furthermore it would also be acceptable, with the digital broadcast recording device 1 of the first embodiment, for the channel which has been set when making a recording appointment to be not only set as the channel when recording, but also to be set as the channel of the digital broadcast recording device 1.

Moreover, although in the first embodiment the use of a selector 4 was explained, it would also be acceptable to arrange to display a main screen with a sub-screen superimposed thereupon, and to arrange, during recording, for it to be possible thereby to select the channel to be recorded; and, in fact, any display method for the image to be recorded would be acceptable.

Although in the first and second embodiments described above the D/A converters 61 and 62 were provided, it is not actually necessary to provide these D/A converters 61 and 62, if an external television which is compatible with digital signals is connected. Furthermore, it would also be acceptable to arrange for the channel scanning processing 71 to record the channel table in the recording unit 32. Yet further, although in these embodiments the signal was received from the antenna 101, it would also be acceptable to receive a signal transmitted via a cable television transmission network.

Moreover although, in the explanation of FIG. 1 and FIG. 3, the processings were explained as separate block, in a practical implementation, it would be acceptable to provide any one or a plurality of these functional blocks by the operation of a unitary IC; or, it would also be acceptable to separate one of the blocks into a plurality of functional portions.

Yet further, if the recording method of the encoder 31 of FIG. 1 is made to be the same as the encoding method of the TS received by the tuner 21, then it is possible to integrate the TV decoder 22 and the decoder 33 into one unit. In this case, the signal of the recording unit 32 would be inputted into the TV decoder 22, instead of into the decoder 33. Moreover, in this case, the selectors 41 and 42 would be eliminated, and a selector which selects between the outputs of the tuner 21 and the recording unit 32 would be provided before the TV decoder 22.

It would also be acceptable to arrange for the channel scanning processing 71 of the control unit to be simply a command to the tuner unit 21. In this case, it would be appropriate to endow a microcomputer or the like, provided within the tuner unit 21 and having a CPU, with a processing which corresponds to the channel scanning processing 71.

Figure 2:
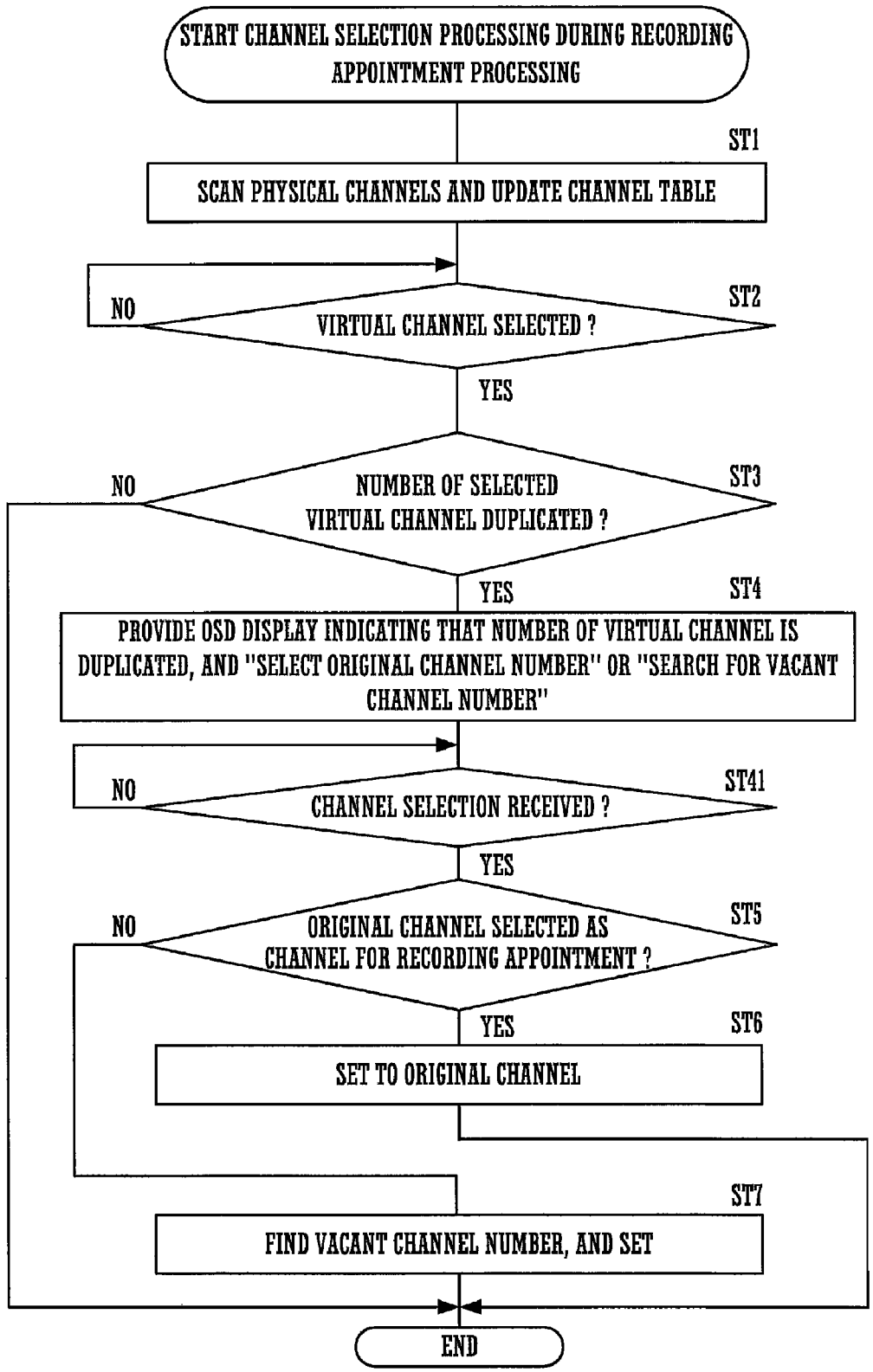
FIG. 2 is a flow chart showing the flow of control during recording appointment processing by this digital broadcast recording device according to the first embodiment.

In the first and the second embodiments, the processing of FIG. 2 and FIG. 4 respectively corresponds to the "channel presetting means" and the "channel duplication cancellation processing" of the Claims.

What is claimed is:

1. A digital broadcast recording device, comprising:

a tuner unit which receives a digital broadcast, and acquires data of a program which is broadcast on a virtual channel included in each physical channel;

a channel table generation means which commands the tuner unit to scan the each physical channel over a predetermined range of frequencies, and creates and updates a channel table in which a correspondence is maintained between physical channels and virtual channels;

an OSD generation unit which outputs an OSD (On-ScreenDisplay) for displaying various states of this digital broadcast recording device;

an actuation unit which receives commands for setting and operation of this digital broadcast recording device;

a recording unit which records the data of the program to a medium;

a recording appointment means which receives, from the actuation unit, a recording appointment which schedules the recording unit to record the data of the program to the medium; and a channel presetting means which, based on the channel table, sets a channel number to a program which is broadcast on a virtual channel included in each physical channel;

wherein the channel presetting means, when the recording appointment means receives the recording appointment, commands the channel table generation means to update the channel table, and judges whether or not the number of the virtual channel corresponding to a channel number for the recording appointment is duplicated among the physical channels, and wherein the recording appointment means, when receiving the recording appointment, if the channel presetting means judges that the number of the virtual channel is duplicated between a first and a second physical channels, performs the following channel duplication cancellation processing:

(A) commands the OSD generation unit to output an OSD message to the effect that the number of the virtual channel is duplicated;

(B) when this OSD message is being output, receives, from the actuation unit, a selection of which one to make an appointment for recording of (i) a first program of a first physical channel on which the channel number for the recording appointment is currently set, and (ii) a second program of a second physical channel on which the channel number for the recording appointment is not set;

(C) when receiving a selection of recording appointment of the first program, makes an appointment for recording with the channel number for the recording appointment; and (D) when receiving a selection of recording appointment of the second program, commands the channel presetting means to set a vacant channel number to the second program, and makes an appointment for recording with the vacant channel number.

* * * * *